US006148604A

United States Patent [19]

Salt et al.

[11] Patent Number: 6,148,604

[45] Date of Patent: Nov. 21, 2000

[54] COMBUSTION CHAMBER ASSEMBLY HAVING A TRANSITION DUCT DAMPING MEMBER

[75] Inventors: Allan J Salt, Nuneaton; David Pritchard, Coventry; Roger Wrightham, Hinckley, all of United Kingdom

[73] Assignee: Rolls-Royce plc, London, United Kingdom

[21] Appl. No.: 09/336,718

[22] Filed: Jun. 21, 1999

[30] Foreign Application Priority Data

Jun. 30, 1998 [GB] United Kingdom .................. 9813972

[51] Int. Cl.[7] ...................................................... F02C 7/28

[52] U.S. Cl. ....................... 60/39.31; 60/39.32; 60/39.37

[58] Field of Search ............................... 60/39.31, 39.32, 60/39.37

[56] References Cited

U.S. PATENT DOCUMENTS

| | | | |
|---|---|---|---|
| 4,688,378 | 8/1987 | Harris . | |
| 5,085,038 | 2/1992 | Todman et al. | 60/39.37 |
| 5,265,412 | 11/1993 | Bagepalli et al. | 60/39.32 |
| 5,353,586 | 10/1994 | Taylor et al. | 60/39.37 |
| 5,592,814 | 1/1997 | Palusis et al. | 60/271 |

FOREIGN PATENT DOCUMENTS

| | | |
|---|---|---|
| 0616111 | 9/1994 | European Pat. Off. . |
| 1010338 | 11/1965 | United Kingdom . |

*Primary Examiner*—Charles G. Freay
*Attorney, Agent, or Firm*—W. Warren Taltavull; Farkas & Manelli PLLC

[57] ABSTRACT

A combustion chamber assembly comprises a plurality of three stage lean burn combustion chambers (28) each of which comprises a primary combustion zone (36), a secondary combustion zone (40) and a tertiary combustion zone (44). Each of the combustion zones (36,40,44) is supplied with premixed fuel and air by respective fuel and air mixing ducts (76,78,80,92). A plurality of transition ducts (118) are provided at the downstream ends of the combustion chambers (28) to receive the exhaust gases. A damping ring (130) is connected to all of the transition ducts (118) by bolts (138) which pass through apertures (128) in flanges (126) on the transition ducts (118). The bolts (138) are biased by springs (142) such that frictional contact between the damping ring (130) and the flanges (126) damps harmful vibrations in the transition ducts (118).

32 Claims, 5 Drawing Sheets

COMBUSTION CHAMBER ASSEMBLY HAVING A TRANSITION DUCT DAMPING MEMBER

The present invention relates generally to a combustion chamber, particularly to a gas turbine engine combustion chamber.

In order to meet the emission level requirements, for industrial low emission gas turbine engines, staged combustion is required in order to minimise the quantity of the oxide of nitrogen (NOx) produced. Currently the emission level requirement is for less than 25 volumetric parts per million of NOx for an industrial gas turbine exhaust. The fundamental way to reduce emissions of nitrogen oxides is to reduce the combustion reaction temperature, and this requires premixing of the fuel and all the combustion air before combustion occurs. The oxides of nitrogen (NOx) are commonly reduced by a method which uses two stages of fuel injection. Our UK patent no. GB1489339 discloses two stages of fuel injection. Our International patent application no. WO92/07221 discloses two and three stages of fuel injection. In staged combustion, all the stages of combustion seek to provide lean combustion and hence the low combustion temperatures required to minimise NOx. The term lean combustion means combustion of fuel in air where the fuel to air ratio is low, i.e. less than the stoichiometric ratio. In order to achieve the required low emissions of NOx and CO it is essential to mix the fuel and air uniformly.

The industrial gas turbine engine disclosed in our International patent application no. $WO_{92/07221}$ uses a plurality of tubular combustion chambers, whose axes are arranged in generally radial directions. The inlets of the tubular combustion chambers are at their radially outer ends, and transition ducts connect the outlets of the tubular combustion chambers with a row of nozzle guide vanes to discharge the hot gases axially into the turbine sections of the gas turbine engine. Each of the tubular combustion chambers has two coaxial radial flow swirlers which supply a mixture of fuel and air into a primary combustion zone. An annular secondary fuel and air mixing duct surrounds the primary combustion zone and supplies a mixture of fuel and air into a secondary combustion zone.

One problem associated with gas turbine engines is caused by pressure fluctuations in the air, or gas, flow through the gas turbine engine. Pressure fluctuations in the air, or gas, flow through the gas turbine engine may lead to severe damage, or failure, of components if the frequency of the pressure fluctuations coincides with the natural frequency of a vibration mode of one or more of the components. These pressure fluctuations may be amplified by the combustion process and under adverse conditions a resonant frequency may achieve sufficient amplitude to cause severe damage to the combustion chamber and the gas turbine engine.

It has been found that gas turbine engines which have lean combustion are particularly susceptible to this problem. Furthermore it has been found that as gas turbine engines which have lean combustion reduce emissions to lower levels by achieving more uniform mixing of the fuel and the air, the amplitude of the resonant frequency becomes greater. It is believed that the amplification of the pressure fluctuations in the combustion chamber occurs because the heat released by the burning of the fuel occurs at a position in the combustion chamber which corresponds to an antinode, or pressure peak, in the pressure fluctuations.

Accordingly the present invention seeks to provide a combustion chamber which reduces or minimises the above mentioned problem.

Accordingly the present invention provides a combustion chamber assembly comprising a plurality of circumferentially spaced combustion chambers, a plurality of circumferentially spaced transition ducts, at least one damping member and at least one fastening assembly, each combustion chamber comprising at least one combustion zone defined by at least one peripheral wall, each transition duct being arranged at the downstream end of a corresponding one of the combustion chambers to receive the exhaust gases from the corresponding one of the combustion chambers, at least one of the transition ducts being connected to the at least one damping member, the at least one transition duct being connected to the at least one damping member by the at least one fastening assembly, each fastening assembly comprising means to resiliently bias the at least one damping member into contact with the at least one transition duct to provide frictional damping of any vibrations of the at least one transition duct.

Preferably each combustion chamber comprises at least one fuel and air mixing duct for supplying air and fuel respectively into the at least one combustion zone, the at least one fuel and air mixing duct having means at its downstream end to supply air and fuel into the at least one combustion zone.

Preferably each combustion chamber comprises a primary combustion zone and a secondary combustion zone downstream of the primary combustion zone.

Preferably each combustion chamber comprises a primary combustion zone, a secondary combustion zone downstream of the primary combustion zone and a tertiary combustion zone downstream of the secondary combustion zone.

The at least one fuel and air mixing duct may supply fuel and air into the primary combustion zone, the at least one fuel and air mixing duct may supply fuel and air into the secondary combustion zone or the at least one fuel and air mixing duct may supply fuel and air into the tertiary combustion zone. The at least one fuel and air mixing duct may comprise a plurality of fuel and air mixing ducts. The at least one fuel and air mixing duct may comprise a single annular fuel and air mixing duct.

The at least one damping member may comprise a damping ring and there are a plurality of fastening assemblies, at least two of the transition ducts being connected to the damping ring, each of the at least two transition ducts being connected to the damping ring by at least one of the fastening assemblies, each fastening assembly comprising means to resiliently bias the damping ring into contact with the corresponding transition duct to provide frictional damping of any vibrations of the at least two transition ducts.

Preferably all of the transition ducts are connected to the damping ring, each of the transition ducts is connected to the damping ring by at least one of the fastening assemblies, each fastening assembly comprising means to resiliently bias the damping ring into contact with the corresponding one of the transition ducts to provide frictional damping of any vibrations of all of the transition ducts.

At least one of the transition ducts may be connected to the damping ring by a plurality of fastening assemblies, alternatively all of the transition ducts may be connected to the damping ring by a plurality of fastening assemblies.

There may be a plurality of damping members, each of the transition ducts being connected to a corresponding one of the damping members, each of the transition ducts being connected to the corresponding one of the damping members by at least one of the fastening assemblies, each fastening assembly comprising means to resiliently bias the damping member into contact with the corresponding transition duct to provide frictional damping of any vibrations of the transition duct. Each of the transition ducts may be connected to the corresponding one of the damping members by a securing assembly, the securing assembly fixedly securing the damping member to the corresponding transition duct. Each of the transition ducts may be connected to the corresponding one of the damping members by a sliding assembly, the sliding assembly allowing relative movement between the damping member and the corresponding transition duct.

Preferably at least one of the fastening assemblies comprises a bolt and a spring, the bolt extending through an aperture in the transition duct, the bolt being secured to the damping ring and the spring acting on the bolt and the transition duct to bias the damping ring into contact with the transition duct.

Preferably at least one of the fastening assemblies comprises a hollow cylindrical spacer having a radially outwardly extending flange at one end, the bolt extending through the spacer, the head of the bolt abutting the flange on the spacer, the spacer extending through the aperture in the transition duct to abut the damping ring and the spring abutting the flange on the spacer.

Preferably at least one of the fastening assemblies comprises a hollow retainer having a radially inwardly extending flange at one end to form an aperture, the bolt and spacer extending through the aperture in the retainer, the retainer surrounding the spacer, the spring and the bolt, the spring abutting the flange on the retainer.

Preferably at least one of the hollow retainers is deformed at the end remote from the flange to retain the spacer and spring within the retainer. Preferably the end remote from the flange is peened.

Preferably the surface of the flange of the retainer abutting the transition duct has a wear resistant coating.

Preferably the surface of the damping ring abutting the transition duct has a wear resistant coating.

Preferably the damping ring has a plurality of apertures to receive the bolts. Preferably the apertures are blind threaded apertures. Preferably the apertures are in the radially outer extremity of the damping ring.

Preferably the damping ring has a further set of apertures in the radially inner extremity of the damping ring to allow the flow of cooling air.

Preferably each transition duct has a flange, the aperture in the transition duct being in the flange.

The present invention will be more fully described by way of example with reference to the accompanying drawings, in which.

Figure 1:
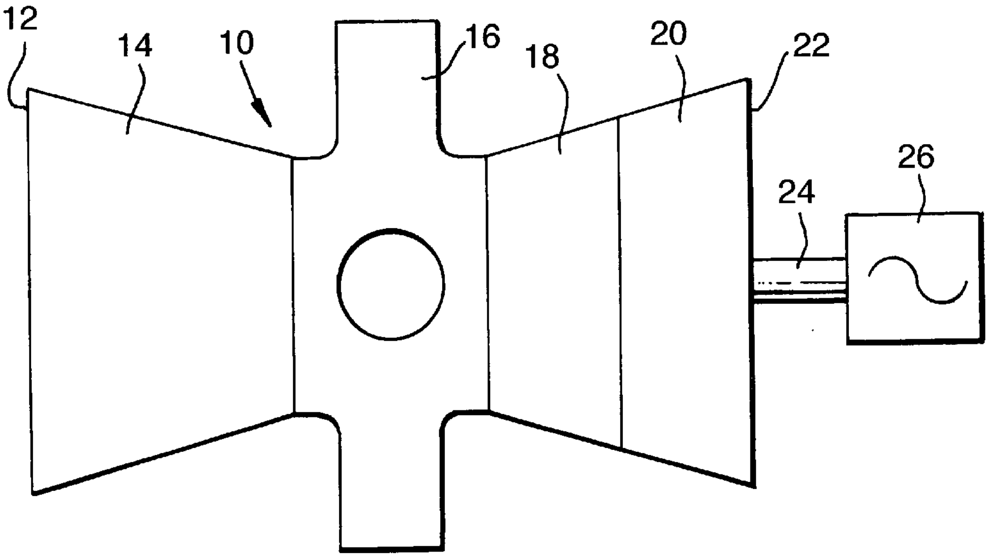
FIG. 1 is a view of a gas turbine engine having a combustion chamber according to the present invention.

An industrial gas turbine engine 10, shown in FIG. 1, comprises in axial flow series an inlet 12, a compressor section 14, a combustion chamber assembly 16, a turbine section 18, a power turbine section 20 and an exhaust 22. The turbine section 20 is arranged to drive the compressor section 14 via one or more shafts (not shown). The power turbine section 20 is arranged to drive an electrical generator 26 via a shaft 24. However, the power turbine section 20 may be arranged to provide drive for other purposes, for examples pumps or propellers. The operation of the gas turbine engine 10 is quite conventional, and will not be discussed further.

Figure 2:
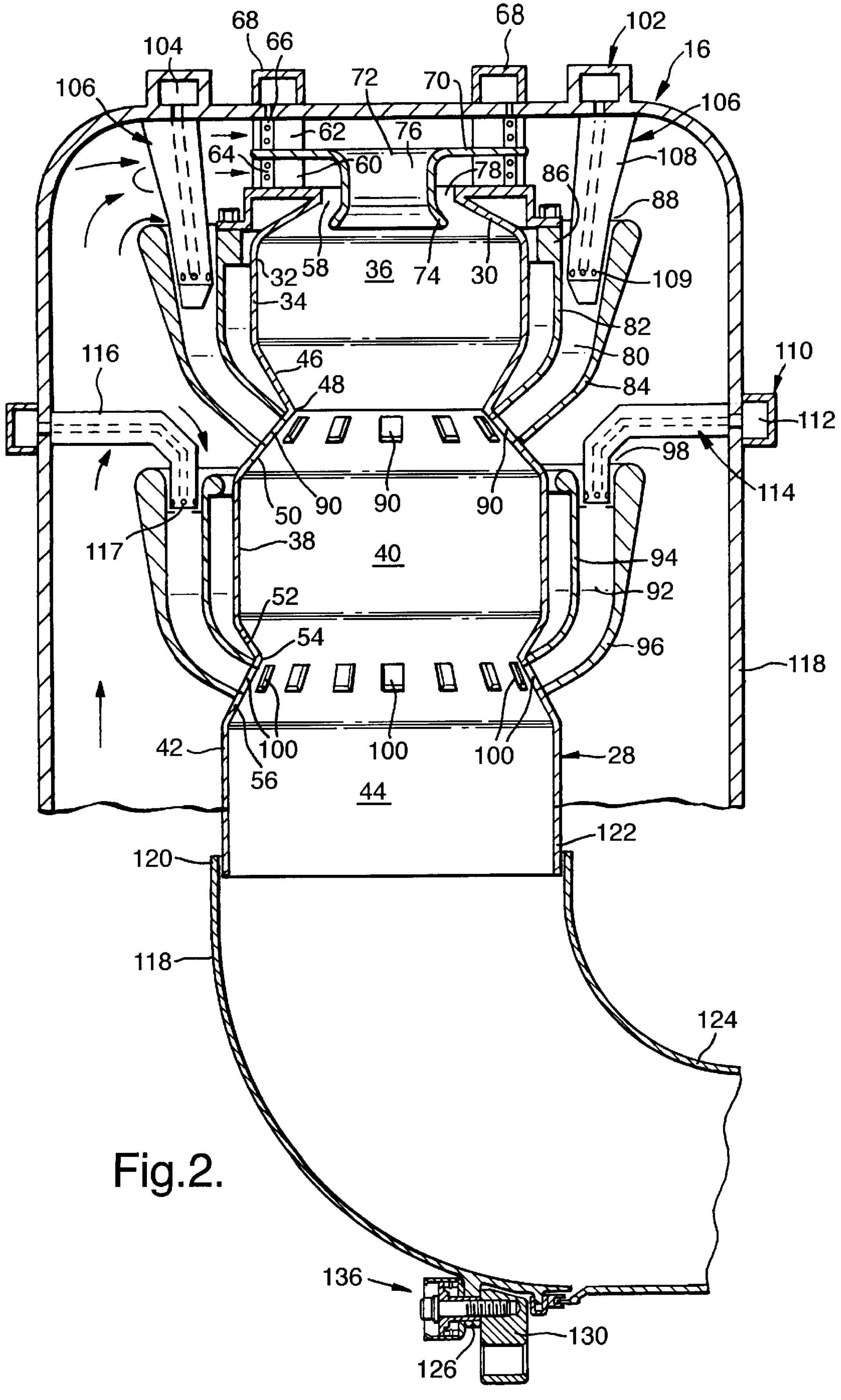
FIG. 2 is an enlarged longitudinal cross-sectional view through through combustion chamber shown in FIG. 1.

The combustion chamber assembly 16 is shown more clearly in FIG. 2. The combustion chamber assembly 16 comprises a plurality of, for example nine, equally circumferentially spaced tubular combustion chambers 28. The axes of the tubular combustion chambers 28 are arranged to extend in generally radial directions. The inlets of the tubular combustion chambers 28 are at their radially outermost ends and their outlets are at their radially innermost ends.

Each of the tubular combustion chambers 28 comprises an upstream wall 30 secured to the upstream end of an annular wall 32. A first, upstream, portion 34 of the annular wall 32 defines a primary combustion zone 36, a second, intermediate, portion 38 of the annular wall 32 defines a secondary combustion zone 40 and a third, downstream, portion 42 of the annular wall 32 defines a tertiary combustion zone 44. The second portion 38 of the annular wall 32 has a greater diameter than the first portion 34 of the annular wall 32 and similarly the third portion 42 of the annular wall 32 has a greater diameter than the second portion 38 of the annular wall 32. The downstream end of the first portion 34 has a first frustoconical portion 46 which reduces in diameter to a throat 48. A second frustoconical portion 50 interconnects the throat 48 and the upstream end of the second portion 38. The downstream end of the second portion 38 has a third frustoconical portion 52 which reduces in diameter to a throat 54. A fourth frustoconical portion 56 interconnects the throat 54 and the upstream end of the third portion 42.

The upstream wall 30 of each of the tubular combustion chambers 28 has an aperture 58 to allow the supply of air and fuel into the primary combustion zone 36. A first radial flow swirler 60 is arranged coaxially with the aperture 58 and a second radial flow swirler 62 is arranged coaxially with the aperture 58 in the upstream wall 30. The first radial flow swirler 60 is positioned axially downstream, with respect to the axis of the tubular combustion chamber 28, of the second radial flow swirler 60. The first radial flow swirler 60 has a plurality of fuel injectors 64, each of which is positioned in a passage formed between two vanes of the radial flow swirler 60. The second radial flow swirler 62 has a plurality of fuel injectors 66, each of which is positioned in a passage formed between two vanes of the radial flow swirler 62. The first and second radial flow swirlers 60 and 62 are arranged such that they swirl the air in opposite directions. The first and second radial flow swirlers 60 and 62 share a common side plate 70, the side plate 70 has a central aperture 72 arranged coaxially with the aperture 58 in the upstream wall 30. The side plate 70 has a shaped annular lip 74 which extends in a downstream direction into the aperture 58. The lip 74 defines an inner primary fuel and air mixing duct 76 for the flow of the fuel and air mixture from the second radial flow swirler 62 into the primary combustion zone 36 and an outer primary fuel and air mixing duct 78 for the flow of the fuel and air mixture from the first radial flow swirler 60 into the primary combustion zone 36. The lip 74 turns the fuel and air mixture flowing from the first and second radial flow swirlers 60 and 62 from a radial direction to an axial direction. The primary fuel and air is mixed together in the passages between the vanes of the first and second radial flow swirlers 60 and 62 and in the primary fuel and air mixing ducts 76 and 78. The fuel injectors 64 and 66 are supplied with fuel from primary fuel manifold 68.

An annular secondary fuel and air mixing duct 80 is provided for each of the tubular combustion chambers 28. Each secondary fuel and air mixing duct 80 is arranged circumferentially around the primary combustion zone 36 of the corresponding tubular combustion chamber 28. Each of the secondary fuel and air mixing ducts 80 is defined between a second annular wall 82 and a third annular wall 84. The second annular wall 82 defines the inner extremity of the secondary fuel and air mixing duct 80 and the third annular wall 84 defines the outer extremity of the secondary fuel and air mixing duct 80. The axially upstream end 86 of the second annular wall 82 is secured to a side plate of the first radial flow swirler 60. The axially upstream ends of the second and third annular walls 82 and 84 are substantially in the same plane perpendicular to the axis of the tubular combustion chamber 28. The secondary fuel and air mixing duct 80 has a secondary air intake 88 defined radially between the upstream end of the second annular wall 82 and the upstream end of the third annular wall 84.

At the downstream end of the secondary fuel and air mixing duct 80, the second and third annular walls 82 and 84 respectively are secured to the second frustoconical portion 50 and the second frustoconical portion 50 is provided with a plurality of apertures 90. The apertures 90 are arranged to direct the fuel and air mixture into the secondary combustion zone 40 in a downstream direction towards the axis of the tubular combustion chamber 28. The apertures 90 may be circular or slots and are of equal flow area.

The secondary fuel and air mixing duct 80 reduces in cross-sectional area from the intake 88 at its upstream end to the apertures 90 at its downstream end. The shape of the secondary fuel and air mixing duct 80 produces an accelerating flow through the duct 80 without any regions where recirculating flows may occur.

An annular tertiary fuel and air mixing duct 92 is provided for each of the tubular combustion chambers 28. Each tertiary fuel and air mixing duct 92 is arranged circumferentially around the secondary combustion zone 40 of the corresponding tubular combustion chamber 28. Each of the tertiary fuel and air mixing ducts 92 is defined between a fourth annular wall 94 and a fifth annular wall 96. The fourth annular wall 94 defines the inner extremity of the tertiary fuel and air mixing duct 92 and the fifth annular wall 96 defines the outer extremity of the tertiary fuel and air mixing duct 92. The axially upstream ends of the fourth and fifth annular walls 94 and 96 are substantially in the same plane perpendicular to the axis of the tubular combustion chamber 28. The tertiary fuel and air mixing duct 92 has a tertiary air intake 98 defined radially between the upstream end of the fourth annular wall 94 and the upstream end of the fifth annular wall 96.

At the downstream end of the tertiary fuel and air mixing duct 92, the fourth and fifth annular walls 94 and 96 respectively are secured to the fourth frustoconical portion 56 and the fourth frustoconical portion 56 is provided with a plurality of apertures 100. The apertures 100 are arranged to direct the fuel and air mixture into the tertiary combustion zone 44 in a downstream direction towards the axis of the tubular combustion chamber 28. The apertures 100 may be circular or slots and are of equal flow area.

The tertiary fuel and air mixing duct 92 reduces in cross-sectional area from the intake 98 at its upstream end to the apertures 100 at its downstream end. The shape of the tertiary fuel and air mixing duct 92 produces an accelerating flow through the duct 92 without any regions where recirculating flows may occur.

A plurality of secondary fuel systems 102 are provided, to supply fuel to the secondary fuel and air mixing ducts 80 of each of the tubular combustion chambers 28. The secondary fuel system 102 for each tubular combustion chamber 28 comprises an annular secondary fuel manifold 104 arranged coaxially with the tubular combustion chamber 28 at the upstream end of the tubular combustion chamber 28. Each secondary fuel manifold 104 has a plurality, for example thirty two, of equi-circumferentially spaced secondary fuel injectors 106. Each of the secondary fuel injectors 106 comprises a hollow member 108 which extends axially with respect to the tubular combustion chamber 28, from the secondary fuel manifold 104 in a downstream direction through the intake 88 of the secondary fuel and air mixing duct 80 and into the secondary fuel and air mixing duct 80. Each hollow member 108 extends in a downstream direction along the secondary fuel and air mixing duct 80 to a position, sufficiently far from the intake 88, where there are no recirculating flows in the secondary fuel and air mixing duct 80 due to the flow of air into the duct 80. The hollow members 108 have a plurality of apertures 109 to direct fuel circumferentially towards the adjacent hollow members 108. The secondary fuel and air mixing duct 80 and secondary fuel injectors 106 are discussed more fully in our European patent application EP0687864A.

A plurality of tertiary fuel systems 110 are provided, to supply fuel to the tertiary fuel and air mixing ducts 92 of each of the tubular combustion chambers 28. The tertiary fuel system 110 for each tubular combustion chamber 28 comprises an annular tertiary fuel manifold 112 positioned outside a casing 118, but may be positioned inside the casing 118. Each tertiary fuel manifold 112 has a plurality, for example thirty two, of equi-circumferentially spaced tertiary fuel injectors 114. Each of the tertiary fuel injectors 114 comprises a hollow member 116 which extends initially radially and then axially with respect to the tubular combustion chamber 28, from the tertiary fuel manifold 112 in a downstream direction through the intake 98 of the tertiary fuel and air mixing duct 92 and into the tertiary fuel and air mixing duct 92. Each hollow member 116 extends in a downstream direction along the tertiary fuel and air mixing duct 92 to a position, sufficiently far from the intake 98, where there are no recirculating flows in the tertiary fuel and air mixing duct 92 due to the flow of air into the duct 92. The hollow members 116 have a plurality of apertures 117 to direct fuel circumferentially towards the adjacent hollow members 117.

As discussed previously the fuel and air supplied to the combustion zones is premixed and each of the combustion zones is arranged to provide lean combustion to minimise NOx. The products of combustion from the primary combustion zone 36 flow through the throat 48 into the secondary combustion zone 40 and the products of combustion from the secondary combustion zone 40 flow through the throat 54 into the tertiary combustion zone 44. Due to pressure fluctuations in the air flow into the tubular combustion chambers 28, the combustion process amplifies the pressure fluctuations for the reasons discussed previously and may cause components of the gas turbine engine to become damaged if they have a natural frequency of a vibration mode coinciding with the frequency of the pressure fluctuations.

A plurality of equally circumferentially spaced transition ducts 118 are provided, and each of the transition ducts 118 has a circular cross-section at its upstream end 120. The upstream end 120 of each of the transition ducts 118 is located coaxially with the downstream end 122 of a corresponding one of the tubular combustion chambers 28, and the downstream end 124 of each of the transition ducts 118 connects and seals with an angular section of the nozzle guide vanes (not shown).

Figure 3:
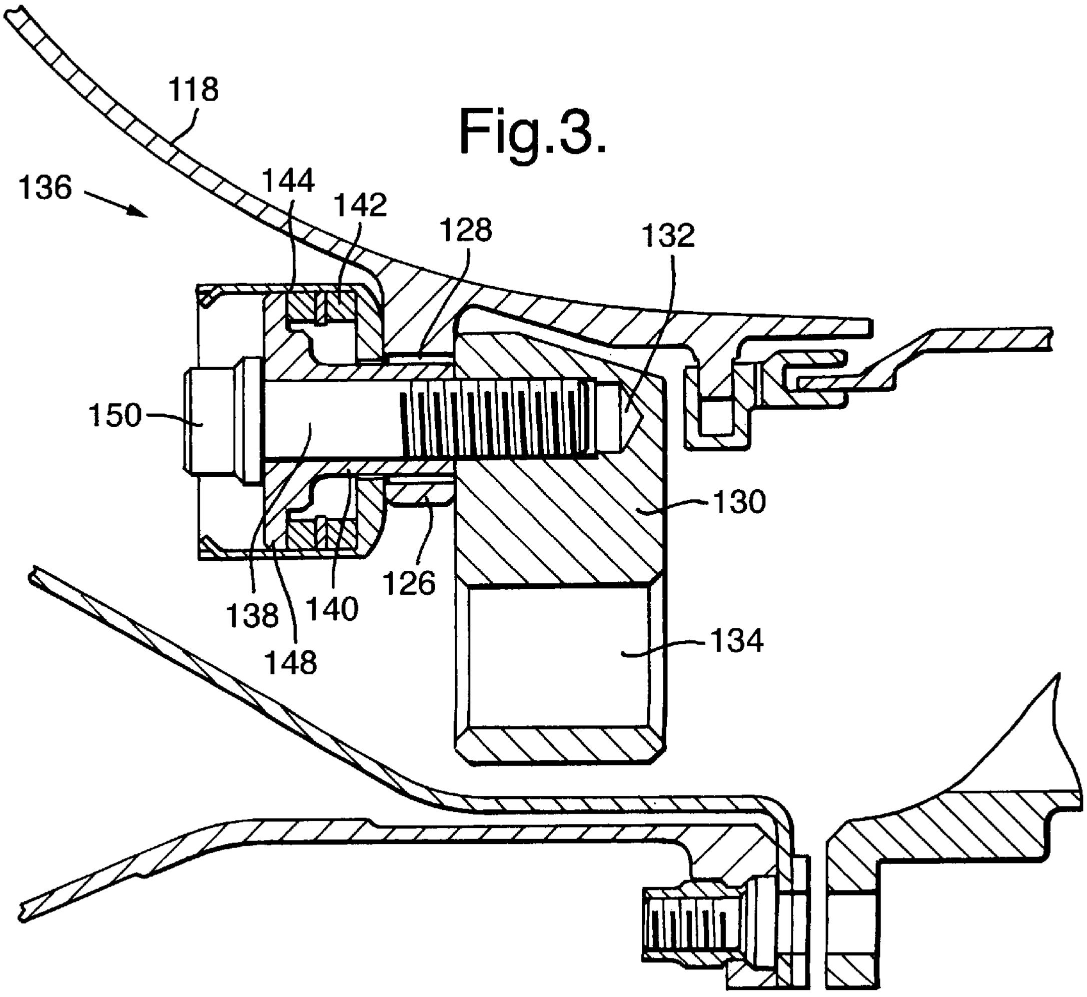
FIG. 3 is a further enlarged longitudinal cross-sectional vie through part of the combustion chamber shown in FIG. 2 showing the damper.
Figure 4:
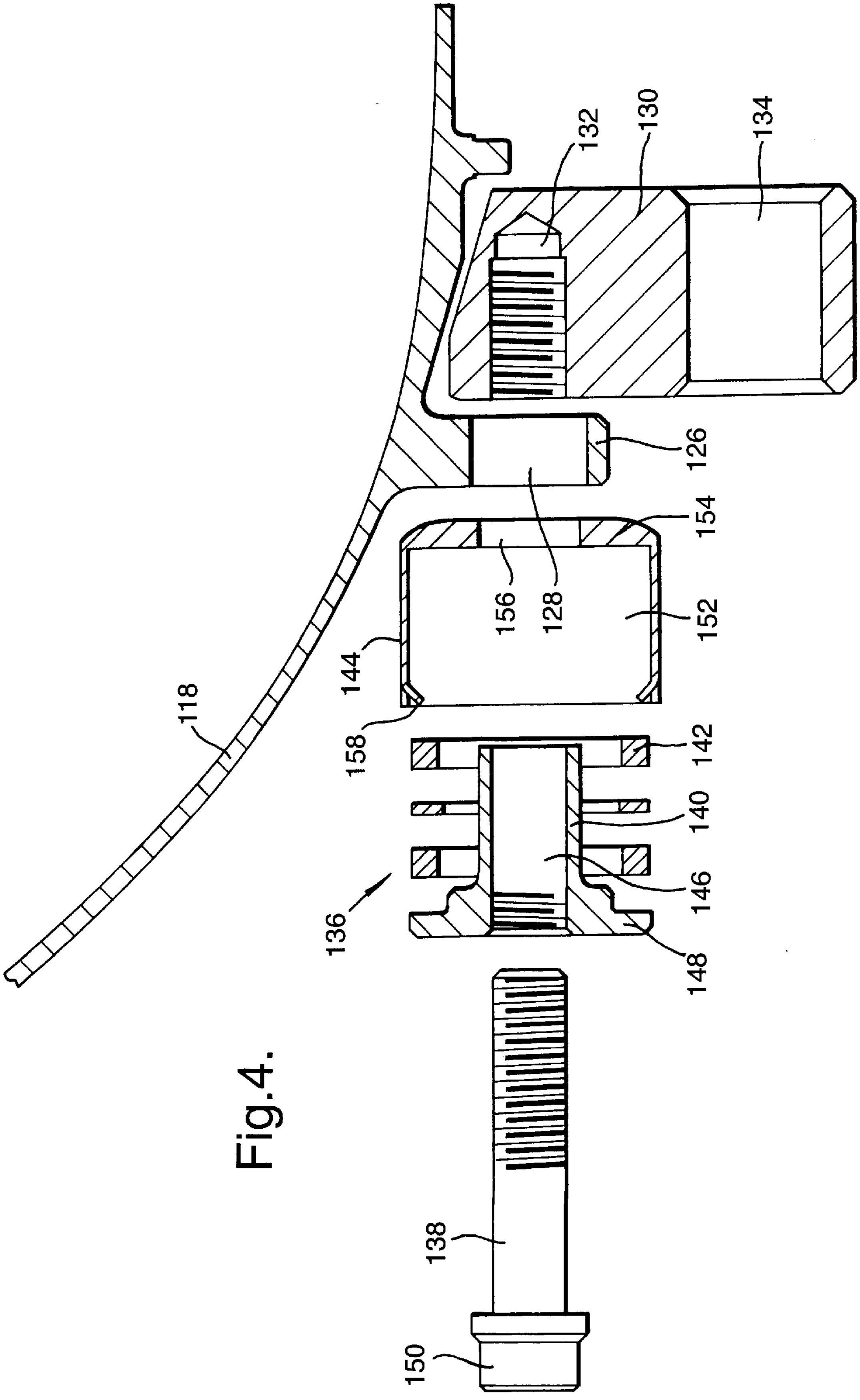
FIG. 4 is an exploded longitudinal cross-sectional view through the damper shown in FIG. 3.

Each transition duct 118 is provided with a flange 126 which has one or more apertures 128 extending therethrough, as shown more clearly in FIGS. 3 and 4. A single damper ring 130 is provided for the combustion chamber assembly, so that the damper ring 130 is connected to each of the transition ducts 118. In particular the damper ring 130 is provided with a plurality of circumferentially spaced axially extending threaded blind apertures 132 in the region towards its radially outermost extremity and a plurality of circumferentially spaced axially extending through apertures 134 in the region towards its radially innermost extremity.

The damper ring 130 is located in the area between the transition ducts 118 and the combustion chamber inner casing. The damper ring 130 is configured to provide the greatest possible mass within the space available.

The damper ring 130 is provided with the through apertures 134 of sufficient numbers and dimensions so that the damper ring 130 does not interfere with the flow of cooling air to the nozzle guide vanes.

The damper ring 130 is required to slide, relative to the transition ducts 118 to damp vibrations of the transition ducts 118. Thus the face of the damper ring 130 contacting the flange 126 is provided with a wear resistant coating.

The damper ring 130 is secured to each of the transition ducts 118 by one or more fastening assemblies 136. Each fastening assembly 136 comprises a bolt 138, a spacer 140, a spring 142 and a cup 144.

The bolt 138 is arranged to be passed through one of the apertures 128 in the flange 126 of a transition duct 118 and threaded into a corresponding one of the threaded apertures 132 in the damper ring 130.

The spacer 140 is cylindrical and has a bore 146 extending axially therethrough, and one end of the spacer 140 is provided with a flange 148 which extends radially outwardly. The bolt 138 is also arranged to be passed through the bore 146 in the spacer 140 and the head 150 of the bolt 138 is arranged to abut the flange 148 of the spacer 140.

The cup 144 is cylindrical and has a large diameter bore 152 extending coaxially therethrough, and one end of the cup 144 is provided with a flange 154 which extends radially inwardly to form a small diameter aperture 156. The bolt 138 is also arranged to be passed through the bore 152 and the aperture 156 in the cup 144. The diameter of the spacer 140 is less than the diameter of the aperture 156 in the flange 154 on the cup 144 such that the end of the spacer 140 remote from the flange 148 passes through the aperture 156 and through the aperture 128 in the flange 126 on the transition duct 118 to abut the damping ring 130.

The outer diameter of the flange 148 on the spacer 140 is arranged to be less than the diameter of the bore 152 of the cup 144 so that the spacer 140 fits within the cup 144. The spring 142 is arranged to abut the flange 148 on the spacer 140 and the flange 154 on the cup 144. The flange 154 on the cup is also arranged to abut the flange 126 on the corresponding transition duct 118. The face of the flange 154 of the cup 144 is coated with a wear resistant coating.

The spring 142 may be any type of spring capable of operating at high temperature and the spring must be made from a suitable material capable of operating at high temperature. The cup 144 is designed to provide the largest bearing area possible between the spring 142 and the flange 126 on the transition duct 118. The cup 144 reacts the load from the spring 142 onto the flange 126 of the transition duct 118. The spacer 140 is configured such that full bolt torque may be applied without compromising the ability of the damper ring 130 and fastening assembly 136 to move under all engine conditions. The spacer 140 also provides the means of spring reaction against the head of the bolt 138.

A feature of the arrangement is that the cup 144 provides a secondary function of providing containment for the bolt 138, spacer 140 and spring 142. The spacer 140 and spring 142 may be tested before assembly into the combustion chamber assembly. Then the end 158 of the cup 144 is peened to retain the spacer 140 and spring 142 within the cup 144, this prevents the spacer 140 and spring 142 being lost in the engine during assembly/disassembly or in the unlikely event of spring failure.

Thus each fastening assembly 136 comprises a spring loaded bolt 138 in which the bolt 138 passes through the spring 142 and the flange 126 on a transition duct 118 and is threaded onto a damping ring 130. The damping ring 130 may be fastened to each transition duct 118 by one or more spring loaded bolts 138. The spring rate of each spring 142 may be varied to permit optimisation of the friction force to provide maximum damping of the transition ducts 118.

The fastening assembly 136 maintains contact between the damping ring 130 and the flange 126 on the transition duct 118 and between the cup 144 and the flange 126 on the transition duct 118 to absorb frettage and wear which ensure consistent and intimate clamping. Any wear is taken up within the working length of the spring 142.

The fastening assembly 136 is a self contained unit hich may be pre-assembled prior to engine build. The spring 142 of the fastening assembly 136 is contained within the cup 144 to minimise the risk of release of failed components into the engine.

The diameter of each aperture 128 in the flange 126 of the transition duct 118 is oversize to ensure that there is a clearance between the spacer 140 and the wall of the aperture 128 at all engine tolerances, transient and thermal conditions. This ensures that controlled friction damps the vibration of the transition ducts 118 by minimising the contact with the wall of the apertures 128 in the flange 126 of the transition ducts 118.

In operation of the gas turbine engine if one or more of the combustion chambers 28 produce noise and this results in vibration of the transition ducts 118, the vibration of the transition ducts 118 is damped by frictional contact between the damping ring 130 and the flanges 126 of the transition ducts 118 and between the cups 144 and the flanges 126 of the transition ducts 118.

Figure 5:
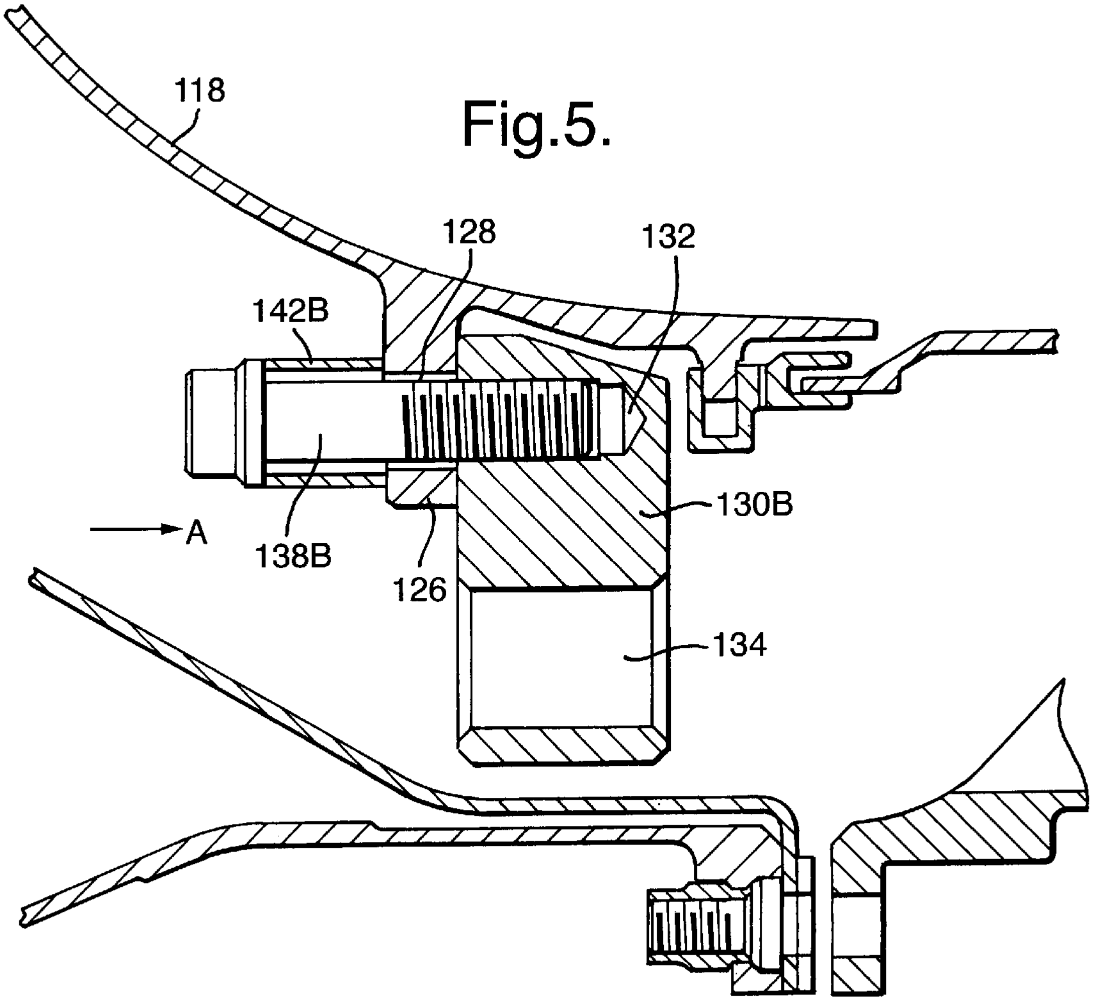
FIG. 5 is a further enlarged longitudinal cross-sectional view through part of the combustion chamber shown in FIG. 2 showing an alternative damper.

FIG. 5 shows an alternative fastening assembly 136B comprising simply a bolt 138B and a spring 142B in which the spring 142B acts on the head of the bolt 138B and upon the flange 126 of the transition duct 118. The fastening assemblies 136B work in a similar manner to damp vibrations of the transition ducts 118 by frictional contact between the damping ring 130B and the flanges 126 of the transition ducts 118.

Although the invention has been described by stating that each transition duct is fastened to the damping ring by one or more fastening assemblies, it may be possible in some instances that not all of the transition ducts are connected to the damping ring. However, it is essential in the case of a damping ring that a plurality of the transition ducts, that is two or more, are connected to the damping ring by fastening assemblies.

Figure 6:
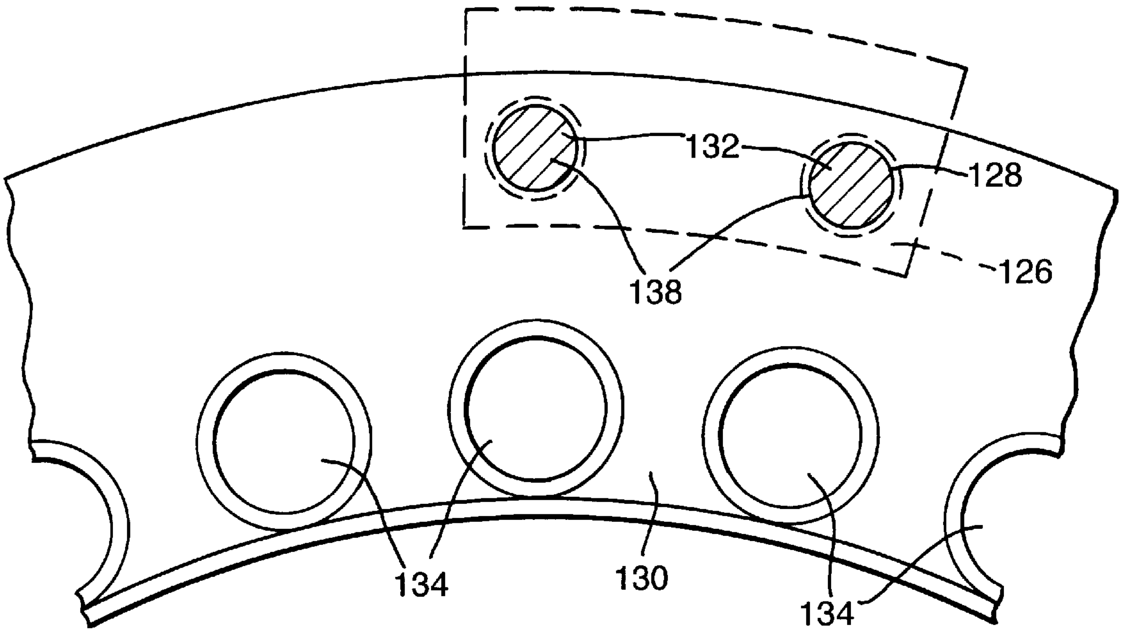
FIG. 6 is a view in the direction of Arrow A in FIG. 5.

FIG. 6 is a view of the damping ring 130 showing the through apertures 134 and the threaded apertures 132. In this instance two threaded apertures 132 are used to secure the damper ring 130 to each of the transition ducts 118 by two fastening assemblies 136 locating through the apertures 128 in the flange 126 of the transition duct 118.

Figure 7:
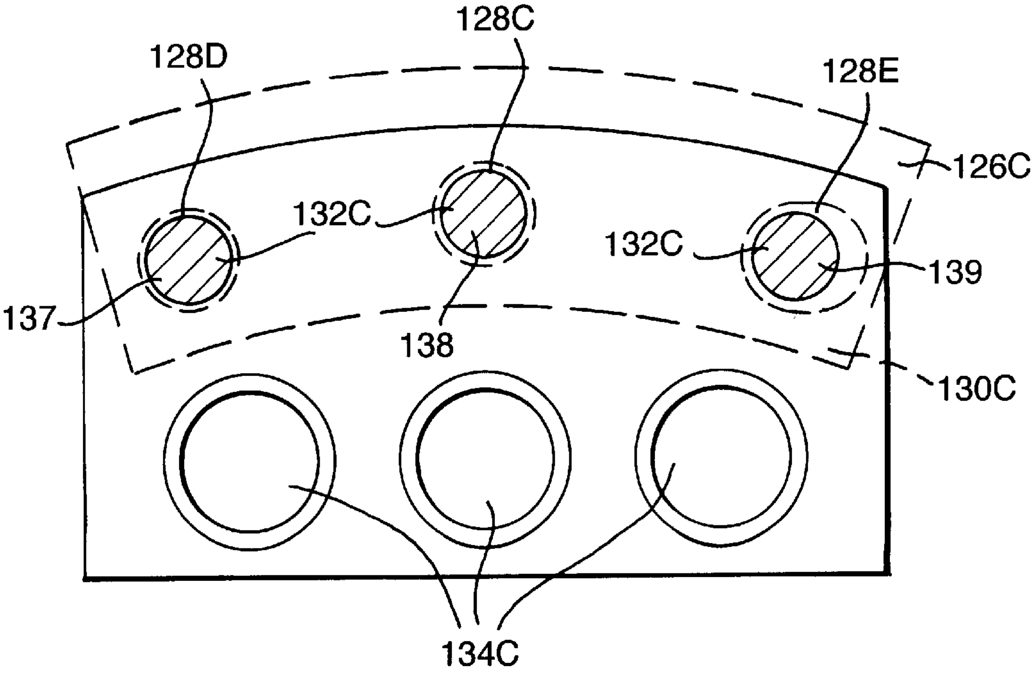
FIG. 7 is an alternative view in the direction of Arrow A in FIG. 6.

FIG. 7 shows an alternative damping member 130C. The combustion chamber assembly 10 comprises a plurality of damping members 130C, one damping member 130C is provided for each transition duct 118. Each damping member 130C is also provided with a plurality of axially extending through apertures 134C in the region towards its radially innermost extremity and a plurality of axially extending threaded blind apertures 132C. For example three apertures 132C are provided all of the same diameter.

The flanges 126C on each transition duct 118 is provided with a plurality of apertures 128C,128D and 128E. The apertures 128C,128D and 128E are different. The aperture 128C, the central aperture of each transition duct 118, is arranged to receive a fastening assembly 136. The aperture 128D of each transition duct 118 is arranged to receive a bolt 137 having the same diameter as the bolt 138 of the fastening assembly 136 such that the bolt 137 in the aperture 128D forms a securing assembly to fixedly secure the damping member 130C to the transition duct 118. The aperture 128E of each transition duct 118 is arranged to be slotted to receive a bolt 139 having the same diameter as the bolt 138 of the fastening assembly 136 such that the bolt 139 in aperture 128E forms a sliding assembly to allow relative movement between the damping member 130C and the transition duct 118. The aperture 128E allows for relative thermal expansion in a tangential direction.

This arrangement works in a similar manner to that in the other embodiments in that the vibration of each transition duct 118 is damped by frictional contact between the damping member 130C and the flanges 126 of the respective transition duct 118 and between the cups 144 and the flanges 126 of the transition ducts 118. The advantage of the arrangement of providing each transition duct 118 with its own damping member 130C is that it allows each transition duct 118 to be easily removed with its damping member 130C rather than having to unfasten the transition ducts 118 from the damping ring 130 to allow the transition duct 118 to be removed.

Although the invention has been described by stating that the transition ducts have flanges to enable the fastening assemblies to connect the transition ducts to the damping ring, the transition ducts may be provided with lugs or other suitable structures to enable the fastening assemblies to connect the transition ducts to the damping ring.

We claim:

1. A combustion chamber assembly comprising a plurality of circumferentially spaced combustion chambers, a plurality of circumferentially spaced transition ducts, at least one damping member and at least one fastening assembly, each combustion chamber comprising at least one combustion zone defined by at least one peripheral wall, each transition duct being arranged at the downstream end of a corresponding one of the combustion chambers to receive the exhaust gases from the corresponding one of the combustion chambers, at least one of the transition ducts being connected to the at least one damping member, the at least one transition duct being connected to the at least one damping member by the at least one fastening assembly, each fastening assembly comprising means to resiliently bias the at least one damping member into contact with the at least one transition duct to provide frictional damping of any vibrations of the at least one transition duct.

2. A combustion chamber assembly as claimed in claim 1 wherein the at least one damping member comprises a damping ring and there are a plurality of fastening assemblies, at least two of the transition ducts being connected to the damping ring, each of the at least two transition ducts being connected to the damping ring by at least one of the fastening assemblies, each fastening assembly comprising means to resiliently bias the damping ring into contact with the corresponding transition duct to provide frictional damping of any vibrations of the at least two transition ducts.

3. A combustion chamber assembly as claimed in claim 2 wherein all of the transition ducts are connected to the damping ring, each of the transition ducts is connected to the damping ring by at least one of the fastening assemblies, each fastening assembly comprising means to resiliently bias the damping ring into contact with the corresponding one of the transition ducts to provide frictional damping of any vibrations of all of the transition ducts.

4. A combustion chamber assembly as claimed in claim 2 wherein at least one of the transition ducts is connected to the damping ring by a plurality of fastening assemblies.

5. A combustion chamber assembly as claimed in claim 4 wherein all of the transition ducts are connected to the damping ring by a plurality of fastening assemblies.

6. A combustion chamber assembly as claimed in claim 1 wherein there are a plurality of damping members, each of the transition ducts being connected to a corresponding one of the damping members, each of the transition ducts being connected to the corresponding one of the damping members by at least one of the fastening assemblies, each fastening assembly comprising means to resiliently bias the damping member into contact with the corresponding transition duct to provide frictional damping of any vibrations of the transition ducts.

7. A combustion chamber assembly as claimed in claim 6 wherein each of the transition ducts is connected to the corresponding one of the damping members by a securing assembly, the securing assembly fixedly securing the damping member to the corresponding transition duct.

8. A combustion chamber assembly as claimed in claim 7 wherein each of the transition ducts is connected to the corresponding one of the damping members by a sliding assembly, the sliding assembly allowing relative movement between the damping member and the corresponding transition duct.

9. A combustion chamber assembly as claimed in claim 1 wherein at least one of the fastening assemblies comprises a bolt and a spring, the bolt extending through an aperture in the transition duct, the bolt being secured to the damping ring and the spring acting on the bolt and the transition duct to bias the damping ring into contact with the transition duct.

10. A combustion chamber assembly as claimed in claim 9 wherein at least one of the fastening assemblies comprises a hollow cylindrical spacer having a radially outwardly extending flange at one end, the bolt extending through the spacer, the head of the bolt abutting the flange on the spacer, the spacer extending through the aperture in the transition duct to abut the damping ring and the spring abutting the flange on the spacer.

11. A combustion chamber assembly as claimed in claim 10 wherein at least one of the fastening assemblies comprises a hollow retainer having a radially inwardly extending flange at one end to form an aperture, the bolt and spacer extending through the aperture in the retainer, the retainer surrounding the spacer, the spring and the bolt, the spring abutting the flange on the retainer.

12. A combustion chamber assembly as claimed in claim 11 wherein at least one of the hollow retainers is deformed at the end remote from the flange to retain the spacer and spring within the retainer.

13. A combustion chamber assembly as claimed in claim 12 wherein the end remote from the flange is peened.

14. A combustion chamber assembly as claimed in claim 11 wherein the surface of the flange of the retainer abutting the transition duct has a wear resistant coating.

15. A combustion chamber assembly as claimed in any of claim 1 wherein the surface of the damping ring abutting the transition duct has a wear resistant coating.

16. A combustion chamber assembly as claimed in claim 9 wherein the damping member is a damping ring, the damping ring has a plurality of apertures to receive the bolts.

17. A combustion chamber assembly as claimed in claim 9 wherein each damping member has a first aperture to receive the bolts.

18. A combustion chamber assembly as claimed in claim 17 wherein each damping member has a second aperture to receive the securing assembly.

19. A combustion chamber assembly as claimed in claim 18 wherein each damping member has a third aperture to receive the sliding assembly.

20. A combustion chamber assembly as claimed in claim 16 or claim 17 wherein the apertures are blind threaded apertures.

21. A combustion chamber assembly as claimed in claim 16 or claim 17 wherein the apertures are in the radially outer extremity of the damping member.

22. A combustion chamber assembly as claimed in claim 16 or claim 17 wherein the damping ring has a further set of apertures in the radially inner extremity of the damping ring to allow the flow of cooling air.

23. A combustion chamber assembly as claimed in claim 9 wherein each transition duct has a flange, the aperture in the transition duct being in the flange.

24. A combustion chamber assembly as claimed in claim 1 wherein each combustion chamber comprises at least one fuel and air mixing duct for supplying air and fuel respectively into the at least one combustion zone, the at least one fuel and air mixing duct having means at its downstream end to supply air and fuel into the at least one combustion zone.

25. A combustion chamber assembly as claimed in claim 24 wherein each combustion chamber comprises a primary combustion zone and a secondary combustion zone downstream of the primary combustion zone.

26. A combustion chamber assembly as claimed in claim 24 wherein each combustion chamber comprises a primary combustion zone, a secondary combustion zone downstream of the primary combustion zone and a tertiary combustion zone downstream of the secondary combustion zone.

27. A combustion chamber assembly as claimed in claim 25 wherein the at least one fuel and air mixing duct supplies fuel and air into the primary combustion zone.

28. A combustion chamber assembly as claimed in claim 25 wherein the at least one fuel and air mixing duct supplies fuel and air into the secondary combustion zone.

29. A combustion chamber assembly as claimed in claim 26 wherein the at least one fuel and air mixing duct supplies fuel and air into the tertiary combustion zone.

30. A combustion chamber assembly as claimed in claim 24 wherein the at least one fuel and air mixing duct comprises a plurality of fuel and air mixing ducts.

31. A combustion chamber assembly as claimed in claim 24 wherein the at least one fuel and air mixing duct comprises a single annular fuel and air mixing duct.

32. A gas turbine engine comprising a combustion chamber assembly as claimed in claim 1.

* * * * *